UNITED STATES PATENT OFFICE.

JESSE M. BLANEY, OF VERONA, NEW JERSEY, ASSIGNOR, BY MESNE ASSIGNMENTS, TO PRIZMA INCORPORATED, A CORPORATION OF MAINE.

COLORED PHOTOGRAPHIC IMAGES AND METHOD OF PRODUCING THE SAME.

1,331,092. Specification of Letters Patent. Patented Feb. 17, 1920.

No Drawing. Application filed May 22, 1918. Serial No. 236,050.

*To all whom it may concern:*

Be it known that I, JESSE M. BLANEY, a citizen of the United States, residing at Verona, in the county of Essex and State of New Jersey, have invented certain new and useful Improvements in Colored Photographic Images and Methods of Producing the Same; and I do hereby declare the following to be a full, clear, and exact description of the same.

The present invention relates to color photography, the objects being to produce a photographic image which is inherently colored but which retains the sharpness, definition, modulation and depth characteristic of photographic productions in black and white. While the invention has been developed more especially for use in positive films to be viewed by projection in motion picture exhibitions, it is susceptible of a wide application in the photographic art and may be utilized wherever an inherently colored photographic image is desired, regardless of whether the picture is to be viewed by transmitted or reflected light, and regardless of the particular media in which the image is formed or the base upon which it is supported.

Generally stated, the invention consists in substituting a salt of tin in the place of the substance silver, for example, forming the image in the sensitive emulsion and in coloring such substitute or replaced image with an organic dye-stuff. A salt of tin which is, as nearly as is practicable, colorless, such, for example, as stannic ferrocyanid having the property of adsorbing suitable dye-stuffs, is preferably employed, and the initial image formed in the emulsion by silver, for example, is preferably completely removed. The substituted or replaced image is not a hydrosol or hydrogel of the salt of the initial image forming metal; it is insoluble in water or in the baths employed in the process and has the same properties when embedded in gelatin that is has when isolated in aqueous media. As before stated, the invention has been developed more especially in connection with its application to the motion picture art where the pictures are viewed by projection on a screen and a concrete example of the production of a positive film will be sufficient to enable the invention to be fully understood.

For convenience, we may assume that a positive having registering images is desired, *i. e.*, a suitable transparent film base having images on both sides, the images being in register and colored in complementary colors so as to give approximately correct color to the pictures projected on the screen.

A negative film is prepared by known means having the desired color values recorded in alternate exposures or picture areas. This is usually accomplished with the use of a panchromatic film and color screens through which the exposures are made to properly record the desired color values.

The double-coated positive film which may be sensitized with ordinary non-panchromatic silver emulsion is printed from the color value negative with different color value impressions on opposite sides of the film base and in registering or congruent relation. The printing may be effected by contact or projection, preferably by contact, and the film is developed, fixed, washed and preferably dried, all by the usual methods. The positive film as thus far described is a known product and the procedure followed in its production is set forth in order that the application of the invention to the so-called two color development of the motion picture art may be more clearly comprehended but it will be understood that the procedure described is but one method of producing a positive adapted to be further treated in effecting the objects of the present invention.

A specific example of the subsequent treatment of the positive film is as follows, the proportions given being those found to be effective, but are susceptible of considerable variation and substitution of equivalents:

1. The film is immersed in a soak bath which prevents hydrolysis of stannic salts in subsequent treatment in the toning bath. The soak bath preferably consists of Water to _____ 1000 c. c.
Glycerin _____ 75 c. c.
Acid hydrochloric sp. g.
1.19 _____ 2 c. c.

The object is usually attained by treatment for a period of approximately five minutes.

2. The film is now toned to complete reaction, i. e., the original silver image is completely converted to silver chlorid intermixed with stannic ferrocyanid. An effective toning bath for this purpose is:

| | |
|---|---|
| Water to | 1000 c. c. |
| Acid oxalic | 4. 7 g. |
| Ammonium nitrate | 2. 0 g. |
| Glycerin | 50. 0 c. c. |
| Stannic chlorid sp. g. 1.50 | 13. 9 c. c. |
| Potassium ferricyanid | 5. 5 g. |

3. The silver chlorid is next converted into silver ammonium thiosulfate by immersing the film for a few minutes (about three minutes, for example) in a bath composed of

| | |
|---|---|
| Water to | 1000 c. c. |
| Sodic pyrosulfite | 6.2 g. |
| Sodic thiosulfate | 31.0 g. |
| Ammonium chlorid | 13.4 g. |
| Acid hydrochloric to free $SO_2$. | |

4. The silver salt is eliminated by washing in water freed from metallic salts capable of reaction with the mordant (stannic ferrocyanid), and subsequently slightly acidified if alkaline. This washing leaves an image of stannic ferrocyanid in the normally gelatinous condition of this substance and adapted to act as a mordant for any suitable organic dye-stuffs which may be supplied. It might here be remarked that in adsorbing dye the stannic ferrocyanid apparently contracts, thereby forming a sharp and well defined image.

5. The image printed from the red sensation negative is permitted to adsorb an excess of a suitable green dye and is then washed for a short period.

6. The image printed from the green sensation negative is similarly treated with a suitable red dye and again the film is washed for a few minutes.

From the foregoing example, it will be seen that the important steps are the toning of the developed silver image in a ferricyanid bath containing a salt of tin, whereby the stannic ferrocyanid is reduced by the amorphous silver image with the production of stannic ferrocyanid and silver ferrocyanid, the latter being immediately transposed to silver chlorid and the ferrocyanid thus liberated precipitating its equivalent of stannic ferrocyanid.

The silver chlorid is subsequently removed leaving an image substance which is highly competent to adsorb and retain dye and form a colored image of requisite sharpness and depth.

By the selection of proper dyes and properly balancing the density of the registering colored images on opposite sides of a double coated film, it is practicable to obtain a close simulation of natural colors in motion picture exhibitions. The film may be run on ordinary projecting machines by operators accustomed to operate the same for motion effect only.

While the invention is especially applicable in the motion picture field it is obvious that it is adapted for still work, such as lantern slides or even pictures to be viewed by reflected light, as in the case of ordinary photographic positives.

What is claimed is:

1. The method of producing photographic images which consists in subjecting the silver of a photographic image *in situ* to the action of a soluble salt of tin to render that portion of the latter corresponding to the image insoluble and in treating the insoluble material with a dye of the desired color to produce a colored image.

2. The method of producing photographic images which consists in subjecting the silver of a photographic image *in situ* to the action of a soluble salt of tin to reduce the latter to an insoluble condition corresponding to the image, then removing the silver residue and treating the insoluble image forming material with a dye of the desired color.

3. The method of producing photographic images which consists in substituting for the silver forming the initial photographic image a salt of tin, removing the silver forming the initial image and treating the tin image forming material with a dye of the desired color to produce a colored image.

4. The method of producing photographic images which consists in subjecting the silver forming the initial image to the action of stannic ferricyanid and in treating the resultant image forming material with a dye of the desired color.

5. The method of producing photographic images which consists in substituting for the silver forming the initial image an insoluble gelatinous stannic ferrocyanid image forming material and in treating the latter with a dye of the desired color.

6. The method of producing photographic images which consists in subjecting the silver forming the initial image to the action of stannic ferricyanid, eliminating the silver image and in treating the remaining image forming material with a dye of the desired color to form a colored image.

7. The method of producing photographic images which consists in producing an initial photographic image of silver; treating the silver image in a bath containing stannic ferricyanid and a halid acid, eliminating the silver, and treating the stannic ferrocyanid constituting the final image forming material with a dye of the desired color.

8. The method of producing photographic images which consists in producing an initial photographic image of silver, treating the silver image in a bath containing a salt of tin and thereby converting the silver into a salt of silver, eliminating the silver salt and treating the remaining image forming tin salt with a dye of the desired color.

9. The method of producing photographic images which consists in producing an initial photographic image of silver, treating the silver image in a bath containing stannic ferricyanid and a halid acid and thereby converting the silver into a salt, eliminating the silver salt and treating the remaining image forming stannic ferrocyanid with a dye of the desired color.

10. A photograph having an image composed chiefly of a colored salt of tin.

11. A photograph having an image composed chiefly of a colored stannic ferrocyanid.

12. A photograph having an image composed chiefly of a gelatinous stannic salt colored to correspond to the color and shadows of the object of which it is an image.

13. A photograph having an image composed chiefly of a gelatinous stannic ferrocyanid colored to correspond to the color and shadows of the object of which it is an image.

14. A double coated positive film having congruent images thereon composed chiefly of stannic ferrocyanid and colored respectively with complementary colors.

JESSE M. BLANEY.